US006212532B1

(12) United States Patent
Johnson et al.

(10) Patent No.: US 6,212,532 B1
(45) Date of Patent: Apr. 3, 2001

(54) TEXT CATEGORIZATION TOOLKIT

(75) Inventors: David B. Johnson, Cortlandt Manor, NY (US); Thomas Hampp-Bahamueller, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/176,322

(22) Filed: Oct. 22, 1998

(51) Int. Cl.$^7$ .................................................. G06F 17/20
(52) U.S. Cl. .............................................. 707/500; 707/3
(58) Field of Search ................................... 707/500, 501, 707/530, 3, 4, 5; 382/176

(56) References Cited

U.S. PATENT DOCUMENTS

| | | | |
|---|---|---|---|
| 5,050,222 | * | 9/1991 | Lee ........................................ 382/176 |
| 5,117,349 | * | 5/1992 | Tirfing et al. ............................ 707/3 |
| 5,371,807 | * | 12/1994 | Register et al. ...................... 382/159 |
| 5,873,056 | * | 2/1999 | Liddy et al. .............................. 704/9 |
| 6,047,277 | * | 4/2000 | Parry et al. ............................. 706/20 |
| 6,105,023 | * | 8/2000 | Callan ..................................... 707/5 |
| 6,137,911 | * | 10/2000 | Zhilyaev ............................... 382/225 |

OTHER PUBLICATIONS

Salton et al., "Automatic structuring and retrieval oflarge text files"; Commun. ACM 37, 2 (Feb. 1994), pp. 97–108.*
Riloff, "Using cases to represent context for text classification"; Proceedings of the second international conference on Information and knowledge management,1993, pp. 105–113.*

Hoch, "Using IR techniques for text classification in document analysis";Proceedings of the seventeenth annual international ACM–SIGIR conference on Research and development in information retrieval, 1994, pp. 31–40.*

* cited by examiner

*Primary Examiner*—Stephen S. Hong
(74) *Attorney, Agent, or Firm*—McGuireWoods, LLP; Stephen C. Kaufman, Esq.

(57) ABSTRACT

A module information extraction system capable of extracting information from natural language documents. The system includes a plurality of interchangeable modules including a data preparation module for preparing a first set of raw data having class labels to be tested, the data preparation module being selected from a first type of the interchangeable modules. The system further includes a feature extraction module for extracting features from the raw data received from the data preparation module and storing the features in a vector format, the feature extraction module being selected from a second type of the interchangeable modules. A core classification module is also provided for applying a learning algorithm to the stored vector format and producing therefrom a resulting classifier, the core classification module being selected from a third type of the interchangeable modules. A testing module compares the resulting classifier to a set of preassigned classes, where the testing module is selected from a fourth type of the interchangeable modules, where the testing module tests a second set of raw data having class labels received by the data preparation module to determine the degree to which the class labels of the second set of raw data approximately corresponds to the resulting classifier.

16 Claims, 3 Drawing Sheets

```
Nbr Type Docs Tokens MaxFreq DocID Classes 1 <Picture:
$\backslash$>TITLE <Picture: $\backslash$>word<Picture:
$\backslash$>BAR 2 <Picture: $\backslash$>TITLE <Picture:
$\backslash$>word <Picture: $\backslash$cocoa...
1  D 1 441 23 2987 cocoa 1@1 2@1 3@1 4@1 ...
2  D 1 104 6 2546 grain <Picture: $\backslash$>wheat 7@2 17@1 18@2
...
3  D 1 127 13 9141 veg-oil 7@1 9@2 18@2 19@9 ...
4  D 1 94 4 15402 _unclassified_ 7@2 9@1 18@2 ...
5  D 1 60 4 720 earn 7@3 9@1 21@1 34@2 ...
6  D 1 207 15 80667 acq 5@1 7@15 18@6 21@4  ...
7  D 1 44 6 98759 earn 29@1 44@1 49@1 56@6 ...
8  D 1 134 10 98759 earn <Picture: $\backslash$>acq7@10 9@5 16@1
...
9  D 1 93 9 71529 earn 18@3 21@2 39@1 49@2 ...
10 D 1 34 7 217 earn 56@7 134@2 184@1 289@1 ...
...
1 C 75 16935 1045 bop 5@18 7@1045 8@6 9@727
2 C 2 455 26 cornglutenfeed 7@26 9@8 16@1
3 C 3 656 55 propane 7@55 8@3 9@18 16@2
4 C 1 60 6 seed 7@3 9@6 14@1
5 C 1 93 12 lin-meal7@1 9@2 18@12
6 C 6 1805 124 l-cattle5@1 7@124 8@1
7 C 538 95385 6728 money-fx5@75  6@3 7@6728
...
1 T 9603 1199692 65274 _total_ 1@1 2@44 3@12 4@11
```

FIG.2

| NAME | Precision | Recall | Accuracy | Frequency | Documents |
|---|---|---|---|---|---|
| acq | 0.914 | 0.814 | 0.943 | 21.8% | 719 |
| alum | 0.895 | 0.739 | 0.998 | 0.698% | 23 |
| austdlr $ | 1.00 | 0.00 | 1.00 | 0.00% | 0 |
| barley | 0.857 | 1.00 | 0.999 | 0.364% | 12 |
| bop | 0.895 | 0.567 | 0.995 | 0.910% | 30 |
| can $ | 1.00 | 0.00 | 1.00 | 0.00% | 0 |
| carcass | 0.824 | 0.778 | 0.998 | 0.546% | 18 |
| . | | | | | |
| . | | | | | |
| . | | | | | |
| reserves | 0.625 | 0.556 | 0.996 | 0.546% | 18 |
| retail | 1.00 | 0.500 | 1.00 | 0.0607% | 2 |
| rice | 0.759 | 1.00 | 0.998 | 0.668% | 22 |
| rubber | 0.818 | 0.750 | 0.998 | 0.364% | 12 |
| ship | 0.853 | 0.652 | 0.988 | 2.70% | 89 |
| silver | 0.667 | 0.500 | 0.998 | 0.243% | 8 |
| sorghum | 0.571 | 1.00 | 0.998 | 0.243% | 8 |
| soy_meal | 1.00 | 0.273 | 0.998 | 0.334% | 11 |
| soy_oil ! | 1.00 | 0.00 | 0.997 | 0.273% | 9 |
| soybean | 0.667 | 0.581 | 0.993 | 0.941% | 31 |
| stg $ | 1.00 | 0.00 | 1.00 | 0.00% | 0 |
| . | | | | | |
| . | | | | | |
| . | | | | | |

FIG.3

TEXT CATEGORIZATION TOOLKIT

BACKGROUND OF THE INVENTION

1. Field of the Invention

The present invention generally relates to computer text classification and, more particularly, to a framework which provides an environment where testing several options can be done in an efficient and structured manner.

2. Background Description

Businesses and institutions generate many documents in the course of their commerce and activities. These are typically written for exchange between persons without any plan for machine storage and retrieval. The documents, for purposes of differentiation, are described as "natural language" documents as distinguished from documents or files written for machine storage and retrieval.

Natural language documents have for some time been archived on various media, originally as images and more recently as converted data. More specifically, documents available only in hard copy form are scanned and the scanned images processed by optical character recognition software to generate machine language files. The generated machine language files can then be compactly stored on magnetic or optical media. Documents originally generated by a computer, such as with word processor, spread sheet or database software, can of course be stored directly to magnetic or optical media. In the latter case, the formatting information is part of the data stored, whereas in the case of scanned documents, such information is typically lost.

There is a significant advantage from a storage and archival stand point to storing natural language documents in this way, but there remains a problem of retrieving information from the stored documents. In the past, this has been accomplished by separately preparing an index to access the documents. Of course, the effectiveness of this technique depends largely on the design of the index. A number of full text search software products have been developed which will respond to structured queries to search a document database. These, however, are effective only for relatively small databases and are often application dependent; that is, capable of searching only those databases created by specific software applications.

The natural language documents of a business or institution represents a substantial resource for that business or institution. However, that resource is only a valuable as the ability to access the information it contains. Considerable effort is now being made to develop software for the extraction of information from natural language documents. Such software is generally in the field of knowledge based or expert systems and uses such techniques as parsing and classifying. The general applications, in addition to information extraction, include classification and categorization of natural language documents and automated electronic data transmission processing and routing, including E-mail and facsimile.

SUMMARY OF THE INVENTION

It is therefore an object of the present invention to provide an environment where testing out several options can be done in an efficient and structured manner.

The present invention describes a method and apparatus for computer text classification and, more particularly, to a framework which provides an environment where testing several options can be done in an efficient and structured manner.

The process of the present invention includes mainly:

1. Feature definition: Typically this involves breaking the text up into tokens. Tokens can then be reduced to their stems or combined to multi-word terms.

2. Feature count: Typically this involves counting the frequencies of tokens in the input texts. Tokens can be counted by their absolute frequency, and several relative frequencies (relativized to the document length, the most frequent token, square root, etc.).

3. Feature selection: This step includes weighting features (e.g., depending on the part of the input text they occur in: title vs. body), filtering features depending on how distinctive they are for texts of a certain class (filtering can be done by stop word list, based on in-class vs. out-class frequency etc.).

The present invention provides tools for all these tasks.

The apparatus of the present invention includes inputting raw annotated input data document collection means which collects raw data from an application. The raw data is submitted to a data preparation module, where the data is prepared for testing and training. The data preparation module splits the data randomly according to a user specification and submits a portion of the prepared data to a test data collection module and a portion of the data to a training data document collection module. The test data document collection module submits the data to be tested to a testing module, while the training data module submits data for training to a feature extraction module. The feature extraction module is divided into a feature definition module and a feature selection module, each having their own configuration files. The feature definition module, breaks the text up into tokens, which can then be reduced to their stems or combined to multi-word terms. The feature selection module weights the features. The feature selection module may also filter features depending on how distinctive they are for texts of a certain class.

The extracted data is then submitted to a feature vector module where the extracted data is provided in a vector format, such as a feature count table. This data may then be submitted back to the feature extraction module, where it may then be submitted to a reduced feature vector module. The reduced feature vector module provides the data in a simpler vector format that uses less disk space and is easier to process at a later time. The vector data is then submitted to a machine learning module where an algorithm is applied to the data. At this stage, the present invention stores the various data in a directory tree module, which may store the data in various formats. The testing module then tests the data and provides a precision, recall, accuracy or other statistic analysis of the tested data, as described in detail below. The test module may be provided in a report format.

BRIEF DESCRIPTION OF THE DRAWINGS

The foregoing and other objects, aspects and advantages will be better understood from the following detailed description of a preferred embodiment of the invention with reference to the drawings, in which:

FIG. 2 is an example of a feature count table; and

FIG. 3 is an example of a precision, recall, accuracy, frequency and document table generated by the present invention.

DETAILED DESCRIPTION OF A PREFERRED EMBODIMENT OF THE INVENTION

Figure 1:
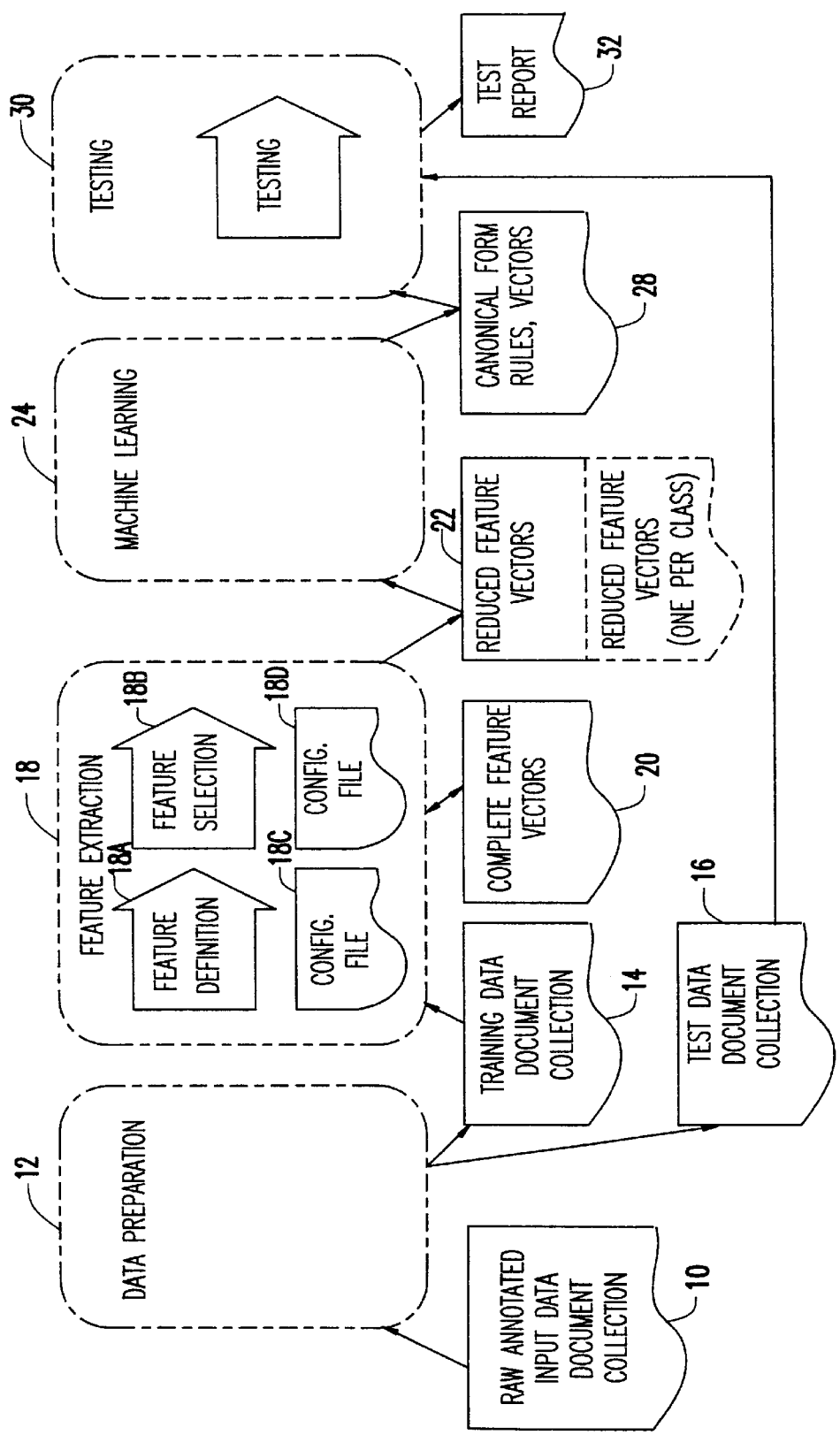
FIG. 1 is a block diagram of the general layout of the present invention.

Text classification typically involves three major tasks including data preparation, training and testing. Data preparation involves obtaining a corpus of pre-classified data and training involves training a classifier on a corpus of pre-classified data. Testing includes testing the classifier with some subset of the pre-classified data set aside for this purpose.

The process of generating training vectors of the present invention can be divided into three steps:

1. Feature definition: Typically this involves breaking the text up into tokens. Tokens can then be reduced to their stems or combined to multi-word terms.

2. Feature count: Typically this involves counting the frequencies of tokens in the input texts. Tokens can be counted by their absolute frequency, and several relative frequencies (relativized to the document length, the most frequent token, square root, etc.).

3. Feature selection: This step includes weighting features (e.g., depending on the part of the input text they occur in: title vs. body), filtering features depending on how distinctive they are for texts of a certain class (filtering can be done by stop word list, based on in-class vs. out-class frequency etc.).

The present invention provides tools for all these tasks. The approach used here is to allow for flexibility and uniformity by using ASCII configuration files that are shared in all three steps involved. The programs used in the three steps also use the same plug-in DLLs for processing (e.g., the rule application DLL) or are at least compiled using the same C++ classes or other languages.

Referring now to the drawings, and more particularly to FIG. 1, there is shown a block diagram of the general layout of the present invention. More specifically, the present invention includes raw annotated input data document collection means 10 which collects raw data from an application and submits the raw data to a data preparation module 12. The raw data is then prepared and split into two components. One component prepared for testing and training while the other component is submitted directly to a testing module 30 in order to determine whether the labels associated with the prepared data of the other component falls into any class, as described below.

In other words, the data preparation module 12 submits the prepared data to the test data collection module 16 and the training data document collection module 14. The test data document collection module 16 submits the data to be tested to the testing module 30, while the training data module 14 submits data for training to the feature extraction module 18.

The feature extraction module 18 is divided into a feature definition module 18a and a feature selection module 18b, each having their own configuration files, 18c, 18d, respectively. The feature definition module 18a, in embodiments, breaks the text up into tokens, which can then be reduced to their stems or combined to multi-word terms. The feature selection module 18b weights the features (e.g., depending on the part of the input text they occur in: title vs. body). In further embodiments, the feature selection module 18b filters features depending on how distinctive they are for texts of a certain class.

The extracted data from the feature definition module 18a is submitted to the feature vector module 20 where the extracted data is provided in a vector format, such as a feature count table. This data may then be submitted back to the feature extraction module 18, where the feature selection module 18b further reduces and/or alters the data and places it into a reduced feature count table in the reduced feature vector module 22. The reduced feature vector module 22 provides the data in a simpler vector format that uses less disk space and is easier to process at a later time. The vector data is then submitted to a machine learning module 24 where an algorithm is applied to the data.

At this stage, the present invention stores the various data in a decision tree form, rule form or a vector form in module 28, which may store the data in various formats such as a directory tree, vectors, etc. The testing module 30 then tests the data and provides, in embodiments, a precision, recall, accuracy or other statistic analysis of the tested data, as described in detail below. The testing module 30 submits the test data to a test report module 32, where a report on the test data is provided.

The modules of the present invention are interchangeable with modules that perform the same function, but in a different manner. For example, the machine learning module may be either a rule based engine, a vector based engine and a multiplicative update based algorithm engine In the practice of the invention, and more specifically (with reference to FIG. 1), since the task of training for text categorization has several stages, the present invention saves the output of each stage for later use. If different settings have to be tested for parts of the process, only the steps affected by the new settings have to be redone. This is important as text categorization often involves huge amounts of data, and the user does not want, for example, to re-parse 5 MB of text, just to "quickly" try out an option in the last step of training.

The toolkit of the present invention stores the various options in a directory tree in the decision tree module 28 of FIG. 1. That way, the various runs with different settings can be structured more easily. Typically, this step corresponds to a directory level in the tree below the input data.

The following sections describe the tools and procedures used in the three main classification tasks of the present invention, and further refer to FIG. 1.

Training

The training task follows the three steps described above, i.e., feature definition, feature count and feature selection. Usually, training data is delivered as one or more (text) files, where each file may contain any number of documents, which are annotated with class information and possibly a document identifier.

Starting from this, the following steps are performed:

Filtering out unwanted categories.

Splitting the data into training and test data.

Acquiring information about the data set.

Feature definition and counting program.

Feature selection program.

The feature definition performs a process which extracts the text to be used for training from an SGML file or other file (can be text from different tags, e.g., TEXT and HEADER). It thereafter extracts the class label(s) and tokenizes the texts. In embodiments, the feature definition also performs stemming, abbreviation expansion, names or term extraction etc., thereby defining the features to be used. The process then computes the feature counts in various ways, such as computing the class and overall counts for the features.

Thereafter, an output is obtained in a feature count table with one column for each defined feature (features occurring in different sections of the input are counted separately) and one line for each input document. The feature count table is processed in either the complete feature vector module 20 or the reduced feature module 22. Also provided are one line for each defined class and one overall summary line. Each cell in this table contains several different counts for the feature (absolute count plus several relative counts). This representation (as described with reference to FIG. 2) is designed to be as information rich as possible so that various training runs using different counting, weighting or filtering strategies do not have to revisit the input text.

The feature selection module 18b performs a process which selects which type of word count (absolute, binary or a relative count) to use. After this selection three steps of computation are executed:

1. Filtering features, for example, using a stop word list or filtering on word frequencies (absolute/relative, threshold/in-class out-class).
2. Weighting features, for example, by the section of the input text they occurred in (e.g., Body vs. Header).
3. Merging features, for example, merging all features from different sections of the input text into one feature (as an intermediate output, this results in a feature value table). Usually this has to be done one time for each class one wants to train on. Finally, the feature value table is written to disk. The format of the output can be adapted for different machine learning programs.

The output of the merging feature function is a table with vectors suitable as input for the chosen machine learning program as referred to in FIG. 1 as the provided in the reduced feature vector module 22.

Testing

Testing uses the fraction of the input text set aside in the training step. The test program takes a file in the SGML tagged format as input and consults the configuration file (the same used during training). The testing program also does the same feature definition steps (using the same plug-in DLLs) and uses the same counts, filters, weights and merging as defined in the configuration file 18d. The resulting feature table for the document is then processed using the classifier learned in the learning step. The result is a (possibly empty) set of proposed classes for the document, which is then compared with the class(es) annotated for the document in the SGML file.

Detailed statistics of precision and recall (overall, per class, etc.) may be written to disk.

Application

To apply the training results to a new document, the same configuration file as performed in the training and testing modules of FIG. 1 is consulted. The application applies the rules (or vectors) generated in the training step to the new document and prints the categories predicted by the rules (vectors) to the screen. That is, the testing module 30 compares class labels assigned by the classifier (i.e., of the prepared dat preassigned class labels of the testing data from the module 16.

By way of example, the application step typically is integrated into an application (e.g. a mail routing/answering application like Lotus Notes). In order to accomplish this, a DLL/shared library based classification API is provided. The text from these applications does not have to be in an SGML format, such that an application using any classification API can feed the text directly to the classification engine. The application program feeding the classification API has to, in embodiments, flag sections of the input text consistent with the tags used in training. The actual classification application is using the same source code that is used in the test program.

Directory Hierarchy

In preferred embodiments, the data used and produced by the toolkit of the present invention is organized in a specific directory hierarchy as provided in the decision tree module 28 of FIG. 1. To organize the data in this manner serves a two-fold purpose, namely, (i) allowing the toolkit to make assumptions about input data which is essential to keep the number of switches down to a manageable level and (ii) by imposing a certain organization on all users, it also helps the user to find data that was produced by another user. For example purposes only, the directory of the present invention may include, but is not limited to:

1. The toolkit root directory: This directory may contain the major data directories as sub-directories. It also may contain a directory to store files common to all data sets (such as a stop-word list, e.g.) and a default data directory that contains default initialization files. This directory may also contain the programs that make up the toolkit as a whole. The root directory can also be set with an environment variable.

2. The data directories: The data directories, in preferred embodiments, contain the training and testing data. Other files in this directory may also be relevant to the data set as a whole, e.g., a list of all categories to be trained on, if not all categories are considered. As subdirectories, the data directories contain feature definition directories. If, for example, the data are processed with a number of different tokenizers, or with and without name and term extraction, then different subdirectories for these different feature definition steps may be created. This is useful if only one feature definition strategy is ever used, or a particular one is used most of the time. The data directories may be organized hierarchically.

3. Feature definition directories: Before a feature definition run, this directory contains only one file, an initialization file for the toolkit feature definition engine. During a run, a feature count table for the training data is created. Subdirectories may be created for each distinct feature selection strategy.

4. Feature selection directories: Each feature selection directory contains an initialization file. After a run, it may also contain a word count file, i.e., a feature count table restricted to the features defined for this run. The subdirectories depend on the classification engines chosen for training. If text output was specified, then there is a directory, for example, text_output. For the classifiers, there may be other specific directories.

5. Classifier directories: The classifier directories are typically empty of data, but also may contain data in certain circumstances. If binary files are not used, but classifier specific training files are used, then these files are in the classifier directory. As with all classifiers, the present invention supports some parameters to be set for training, subdirectories for individual training runs will be created.

6. Parameter directories: These directories contain the results of training. That is, the rule file generated either directly, or as a translation from a decision tree. It may also contain the report file generated by the testing module 30 and submitted to the test report module 32. Furthermore, it may contain some temporary files created by the ML algorithm. They may be useful for debugging purposes.

The Training and Testing Script

This section describes the top-level script that may be used to drive preparation, training and testing in a uniform and easy manner. A detailed description of the individual tools and how to run them outside the toolkit framework is not essential to the understanding of the present invention. However, in embodiments, all the tools display usage information when called without arguments.

Switches to Control Directory Names

To work with the toolkit script, the directories containing the data and initialization files should preferably be organized in the manner described above. This enables the script to organize the produced data in a perspicuous manner. The user receives a warning if directories are missing, and the present invention may create the missing directories.

The script may perform minimal checks on the parameters to the directory switches. Those strings may contain alphanumeric characters, dashes (-) and underscores (_).

Environment Variables

To work properly, the present invention relies on several environment variables. Some are only used internally, but the following may be set by the user, for example:

TOOLKITBASEDIR: This optional variable can hold the (constant) base directory where all Toolkit files are located.

TOOLKITOS: You need to tell the toolkit which operating system it is running under.

TMP or TEMP: This variable tells the script where to generate temporary files in the training phase.

Feature Definition

Before the toolkit actually runs the feature definition program of the feature definition module 18a, it will check that all required files and directories are present. In setup mode, the present invention may also copy missing .ini files from default locations. If an .ini file already exists, the user can decide if (s)he wants to keep it or not. Setup will not actually run feature definition, so the use may have the opportunity to edit the default .ini file.

The output of feature definition is a feature count table file, the input to feature selection. The file will be written to specified directories.

Training

In training mode, a machine learning (ML) algorithm is applied to the data files produced in the feature selection module 18b. Training is usually performed on the binary files. These binary files first need to be translated to a file format that the ML algorithm understands. To increase speeds in a network, these temporary training files are generated locally on the machine where training takes place. Thus, only the small binary files need to be transmitted over the network. Under Aix, the present invention checks for a TMP or TEMP variable set by the user. If such a variable is not set, then the user needs to specify a temp directory on the command line with the -tempdir parameter.

Data Access Rules

The following data access rules apply during training. For example, assume that the user is working on class "X". The script first looks if there is a binary directory, and if so, it generates data in a temporary directory, immediately deleting the data after training. This practice not only saves space, it is also faster when training on a machine other than the one that contains the data. In that case, the huge vector files need not be moved over the network, only the comparatively small binary ones.

If there is no binary directory, the script looks in the classifier directory for the files X.par (the parameter file) and X.slq (the data file). If these do not exist, execution is halted.

Input Document Collection (SGML) Format

In preferred embodiments, the toolkit tools uses an SGML inspired text file format for storing and annotating the input files; however, other files are equally contemplated for use with the present invention. It is SGML based in so far as it used SGML like tags (e.g. <TAGNAME> text </TAGNAME>) to mark units of the text. In embodiments, it is not full SGML since a definition file is not required or used.

A toolkit input file may contain more than one document and all toolkit tools may work on more than one of those input files. This makes it easy to specify the document collection one wants to train/test on.

For training and testing, there must be, in preferred embodiments, a tag with the pre-assigned categories from which the training algorithm should learn the categorization. The default name for that tag is preferably <CLASS>, but the user may equally specify a different default name. If a document is assigned to more than one class, each class label must appear on a separate line. optionally, the toolkit of the present invention may use the content of a tag the user can specify as an identifier for that document.

The user may have the actual text of the document separated within multiple tags. This can be useful since the toolkit of the present invention offers the option to weight, for example, text in the header (or subject lines) more heavily than text in the body of a document.

Configuration File (INI) Format

All configuration information for the toolkit tools is preferably stored in configuration files, such as configuration files 18c, 18d of FIG. 1. These files not only specify information for the individual tools, they also serve as documentation on how files were created. For example, suppose the user has a data directory with a default feature definition subdirectory. If the user already runs feature definition, the default directory will contain a feature count table file and a feature definition, such as an ini-file. In this case, the ini-file serves as documentation on how the feature definition was run to generate the feature count table file. It is thus easy to keep track of experiments that were run with varying settings.

Configuration files may be plain text files that by convention have the extension .ini.

Advanced options

The user may include other ini-files in an .ini file. This may make the system search for a file with the name, for example, <fullpath_or_filename>. If no such file exists, the system may add the path of the .ini file that contains the include directive to <fullpath_or_filename> and look there. Using that mechanism, the user may have the "include" files of an ini-file either at a fully specified path, or the user may write the name and put the include file next to the ini-file that includes such name.

Include files are, in embodiments, used in the toolkit to allow sharing of common configuration options (by having several .ini-files include the same include file). They may also be used to provide default values. By specifying the default in an include file, the user modifying the .ini-file can overwrite values by writing them before the include statement. Since only the first attribute with a given name is used, the values from the ini-file will be used if present, the values from the include file otherwise.

Data Preparation Tools

Besides the core toolkit script for training and testing text categorization, the present invention provides tools that help with the preparation of input data for training. The tasks these tools are designed to help with may be, for example, Filtering out documents from a collection before training.

Random splitting of an input data collection into a test and a training set.

Getting information about category frequencies in an input data collection.

All tools are preferably command line utilities, but other utilities may be equally used and contemplated by the present invention. The tools preferably provide two syntax variants to specify options when calling them, for example, A general purpose syntax for more flexibility.

A restricted syntax that assumes a toolkit directory hierarchy.

The following is only an example of the tools provided by the present invention. It is well understood to one of ordinary skill in the art of the present invention that other tools may be provided. It is also well understood to one of ordinary skill in the art that the logic of the tools, as explained in detail below, may be changed, without necessary changing the function of the tools or impacting on the inventive concepts of the present invention.

Filtering Documents

This tool helps with the task of filtering out unwanted documents from a document collection. The collection should be available in the toolkit SGML format. In preferred embodiments, there are two ways to specify filter conditions for unwanted documents:

Filter by frequency

Filter by category

Filter by frequency allows the user to specify the minimum number of examples (documents) of a category that must be present in the document collection. That is, the user can filter out all categories that have less than n examples. Filter by category allows the user to specify a list of categories to be removed (or kept) in the document collection. This can be used, for example, to remove categories that are known to produce bad results.

In preferred embodiments, the filter makes no changes to the original document collection, but creates a filtered copy of the original. The filter options are specified in a configuration file in .ini format. Ini options may be, for example, DontFilterMultipleCatDocs=BOOLEAN_TOGGLE Where BOOLEAN_TOGGLE is one of: False, True, On, Off, Yes, No, 0, 1. If set to true, documents with more than one value in the filter tag (i.e., with more than one category) are not filtered. (This step is only meant to filter out documents that would make bad negative examples. Categories can be ignored for classification in the feature selection step) Default: true Verbose=BOOLEAN_TOGGLE Where BOOLEAN_TOGGLE is one of: False, True, On, Off, Yes, No, 0, 1. If set to true, detailed output about the progress is displayed. Default: false UseMemBasedProcessing=BOOLEAN_TOGGLE Where BOOLEAN_TOGGLE is one of: False, True, On, Off, Yes, No, 0, 1. If set to true, the whole input data file is kept in memory. This is slightly faster, but may not work for very large files. Default: false Random Splitting Input Data Collections This tool helps with the task of randomly splitting a document collection into several document sets (e.g., a training and a test set). The collection should be, preferably available in the toolkit SGML format.

Random splitting makes no changes to the original document collection, but, in embodiments, creates files that are subsets of the original. Taken all together, these files contain the documents from the original data set.

Percentages

This tool specifies how the data is to be split up between the files. In preferred embodiments, the user may only use integers between 0 and 100 and the percentages must add up to 100. The number of percentages specified must equal the number of file names given under the "Files" attribute.

RandomizeSequence=BOOLEAN_TOGGLE

Where BOOLEAN_TOGGLE is one of: False, True, On, Off, Yes, No, 0, 1. If set to true, the whole order in which the documents are written to the training and test collections is randomized. Otherwise the order is preserved during the split. Default: true Getting Category Frequency Information This tool provides information about the frequency of categories in a document collection. The collection, in preferred embodiments, is available in the toolkit SGML format. This tool, in embodiments, makes no changes to the original document collection, but create an info text file with the frequency information. It produces three tables, preferably, 1. A table of all categories in the collection ordered by their frequency 2. A table listing how often documents with n classes occurred.

3. A table listing only how often categories occurred in documents that had more than one class.

The last two tables are useful only for collections that have multiple classification. The may help finding out how often multiple classification occurred and which classes are involved in multiple classification.

Feature Definition Configuration (FDEF.INI) Format

The feature definition step in the feature definition module 18a of FIG. 1 produces a feature count table (FCT, listing how often each token in the input collection occurred) in the complete feature vector module 20. Basically the feature definition module 18a offers three choices:

1. Count the "raw" tokens as they appear in the text (e.g. "said" is different from "say").

2. Count base forms of the tokens (e.g. "said" is converted to "say")

3. Count base forms and also look for multiword term (e.g. count "International Business Machines") as one token.

The second option is preferred, but the other options may be equally used by the user.

Besides specifying what entities to count, the user may also specify some information about the input data. Most importantly, the user may have to tell the system the name of the tag that marks the classes and the name(s) of the tag(s) that mark the text content of the document.

This FCT is the input to the next step, feature selection in the feature selection module 18b of FIG. 1. The FCT table is intended to be as information rich as possible because it is easier to throw away information at a later stage than to go back to the input collection if information is missing. This is the reason why the present invention keeps this step case sensitive by default, in preferred embodiments, and counts tokens in different sections of the document separately (this allows for later weighting) etc.

Feature Selection Configuration (FSEL.INI) Format

The feature selection step performed in the feature selection module 18b of FIG. 1 takes the feature count table created in the complete feature vectors module 20 and submitted to the feature selection module 18b and applies filtering and aggregation operations on that table and then selects features for output to the feature vector module 22 then to one or more of the core classification engines. To save disk space, the feature selection module 18b, by default, outputs files in a binary format. These files may then be converted on the fly to the input format for the selected core classification engine.

By specifying options in this file, one can determine how tokens are weighted, which features are filtered, how features are scored and selected, what input data for classifiers is produced etc.

Class Level Operations

The class level operations provide filtering options for the score list of feature values for each class.

Feature count table (FCT) Format

The feature count table (FCT) stores the results of the feature definition step performed in the feature definition module 18*a*. Basically, it is a table with one line per document (and one line per category) and one column per token (a token can be a full name like "International Business Machines Corporation"). Each cell in that table specifies how often that token occurred in the document (class). Since most cells have the value 0 the FCT table uses a sparse representation format. Only non-zero cells are written and each cell has the form <COLUMNNBR>@<VALUE>.

Besides the token columns each line is prefixed with a few columns with statistical data about the line (e.g. the total number of tokens in the document (class), the most frequent token in that document (class) etc.) Besides statistical information the FCT has columns with the number and identity of the document, the type of the line (if it is about a document or a class) and the number of documents this line is about (this last information is always 1 for lines that are about documents). There may also be a column with the classes to which the documents belong.

The lines of the FCT preferably come in three sections:

1. First there is one line per document.
2. Then there is one line per category.
3. Finally, there is a single line for the totals.

Then there may be one column per token. The column headers for the token columns may have four different parts, for example:

1. The column number.
2. The document part this token was found in (the name of the tag from the SGML input file).
3. The type of the token ("word" if it is a plain word, "name", "place", "number" etc. for special tokens).
4. The string of the token.

This means that two tokens with the same string are counted separately if they appear in different sections of the input text (that way, the tokens can be weighted separately and added later in the feature selection step). Refer to FIG. 2 for an example.

The Core Classification Engines

The core categorization engines are the programs that actually apply machine learning algorithms in the machine learning module 24 of FIG. 1 to the features defined and selected in the feature definition and feature selection modules 18*a*, 18*b*. Typically, these programs are not designed to work on text, but are general data mining/machine learning tools that take a large set of categorized instances (defined as lists of features and their values) and try to find a classifier. Often, they do not work well when confronted with too many features (this is one reason for feature selection). However, the present invention produces input data readable by the supported classification engines, where the engines work on that data and produce some output specifying their resulting classifier. In the case of rule induction or decision tree algorithms, the output is converted into rule file format. (If vector based classifiers, such as neural net and nearest neighbor algorithms are used, then the output are vectors and corresponding testers compare the vectors.) The rule file is then used for testing the quality of the scheme. The rule file can be used independently of the engine and the toolkit tools in an applier tool.

The toolkit of the present invention supports many different core classification engines which are well known to one of ordinary skill in the art, such as, for example, rule based engines, vector based engines and engines based on a multiplicative update algorithm.

The Toolkit Test Result File

An example of a result file is shown below. The toolkit test result file displays the results of applying a rule set to a set of test data from the test data document collection module 16. A first section gives some general information, where in a second section, the results are detailed on a per-class basis. In each class section, the results for each individual rule are detailed. A final section provides some timing information.

The standard way of running the tester program in the tester module 30, usually provides sufficient information. When running the tester in a verbose mode, a much larger result file will be produced that gives documentation for each document in the test collection.

Every document in the test set is evaluated with respect to every class. For each point in the Document×Class matrix, there are four possibilities: The document is labeled with the category (call that property $D_+$) or not ($D_-$), and the rules say the document is in the class ($R_+$) or not ($R_-$). obviously, the rules predicted right if there is a $D_+R_+$ decision, or a $D_-R_-$ one. In the $D_+R_-$ case, the rules may be too conservative, since they did not recognize a correct instance. In the $D_-R_+$ case, our rules may be too liberal, classifying a document into a category it does not belong.

There are two generally accepted measures for the performance of a classifier on a set of test data: precision and recall. Precision measures the conservativeness of the classifier. The higher the precision, the fewer mis-classifications. Thus, precision is $D_+R_+$ divided by $R_+$ (where $R_+=D_+R_++D_-R_+$).

Recall measures the coverage of the classifier. The more documents assigned to the category they actually belong to, the higher the recall. Thus, recall is $D_+R_+$ divided by $D_+$. Sometimes, only the break-even point between precision and recall is reported. This is either achieved by tweaking the training algorithm until precision and recall turn out to be the same for the test set, or it is simply taken to be the average of the two numbers.

An additional measure sometimes of interest is accuracy. This is the number of correct decisions divided by the number of incorrect ones, i.e., $(D_+R_++D_-R_-)/A$, where A stands for all data points. For the kinds of problems Toolkit is normally applied to, this measure usually provides little information. This is because $D_-R_-$ normally dwarfs the other numbers, and accuracy is thus mostly close to 1.0 (or, in other words, close to 100%).

In the result file, the numbers will often be presented in a table, as seen seen herein.

| D   | 0 −          |
|-----|--------------|
| A + |              |
|     | $D_+R_+$ $D_+R_-$ |
| T   |              |
| A   |              |
|     | $D_-R_+$ $D_-R_-$ |

The Standard Test Result File

"Number of categories appearing in data only" means that there were documents with that class in the test data, but no rules for the class were produced. "Data" in the context of the result file always refers to the test data. The training data is not taken into consideration here.

Later in the text, such categories may be marked with an exclamation mark (!) or other notation.

"Number of categories appearing in rules only" refers to categories for which rules exist, but no document labeled with that class was found in the test data. Such classes will later be marked with a star (*)or other notation.

"Number of categories appearing in class list only" means categories that are members of the list of classes under consideration, but they occur neither in the rules nor in the test data. Such categories will be marked by a dollar sign ($)or other notation.

"Valid categories" means those that occur both in the rule file and the test data.

The macro-average is an average that normalizes over the frequency of class occurrences. It simply takes the average of the percentages for the individual classes. Two such measures are given. One over all classes, and one for the valid classes only. An example of a macro average is set forth below.

Macro—Average (all categories)
 Precision: 0.897
 Recall: 0.411
 Accuracy: 0.996

Macro—Average (valid categories only)
 Precision: 0.840
 Recall: 0.637
 Accuracy: 0.994

The micro-average does not normalize, but treats all categories equally. The micro-average for all categories counts all decisions and their correctness. Adding up the numbers in the table equals the number of categories times the number of test documents.

Category: Microaverage (all categories)
 Precision 0.877
 Recall: 0.781
 Accuracy: 0.996

|   | D | 0 – |
|---|---|---|
| A + | | |
|   | 2892 | 812 |
| T | | |
| A | | |
|   | 405 | 30232 |
| — | | |
|   | 6 | |

The microaverage over the valid categories takes only the valid categories into account.

Category: Microaverage (only "valid" categories)
 Precision: 0.877
 Recall: 0.797
 Accuracy: 0.994

|   | D | 0 – |
|---|---|---|
| A + | | |
|   | 2892 | 736 |
| T | | |
| A | | |
|   | 405 | 19366 |
| — | | |
|   | 7 | |

The following table gives a succinct overview of the test results on a per-class basis. Clearly, precision for categories with no rules (those marked with ! or $) will always be 1.0. Where there are no rules, you can make no mistakes. Conversely, recall for those categories will always be 0.0.

Frequency measures the number of documents in the test set labeled with that class. If there are multiply classified documents, the individual percentages will not add up to 100. Notice that this distribution refers to the test set only, not the training data.

The table below gives the usual numbers, but only for the current class. The cells thus add up to the number of test documents.

|   | D | 0 – |
|---|---|---|
| A + | | |
|   | 585 | 134 |
| T | | |
| A | | |
|   | 55 | 2421 |
| — | | |

FIG. 3 shows an example of a table for precision, recall, accuracy and frequency of documents.

The Verbose Test Result File

The verbose test result file provides information for individual documents. This is mainly useful for debugging purposes, e.g., when the user wants to find out if the rules get applied the way the user thinks they should.

The Categorization Applier

The Categorization Applier is a command line tool to quickly use rules created in the training phase. To apply the training results to a new document, the same configuration file as in training and testing is consulted. It assumes the input text to be in SGML tagged format. Only the tags that were selected for analysis in the training step will be extracted and used. The applier will apply the rules (or vectors) generated in the training step to the document and print the categories predicted by the rules (vectors) to the screen.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A module information extraction system capable of extracting information from natural language documents, the system including a plurality of interchangeable modules, the system comprising:

a data preparation module for preparing a first set of raw data having class labels to be tested, the data preparation module being selected from a first type of the interchangeable modules;

a feature extraction module for extracting features from the raw data received from the data preparation module and storing the features in a vector format, the feature extraction module being selected from a second type of the interchangeable modules;

a core classification module for applying a learning algorithm to the stored vector format and producing therefrom a resulting classifier, the core classification module being selected from a third type of the interchangeable modules; and a testing module for comparing the resulting classifier to a set of preassigned classes, the testing module being selected from a fourth type of the interchangeable modules, wherein the testing module tests a second set of raw data having class labels received by the data preparation module to determine whether the class labels of the second set of raw corresponds to the resulting classifier.

2. The module information extraction system of claim 1, further comprising a module for storing the data in vector format after applying the learning algorithm to the vector format.

3. The module information extraction system of claim 1, wherein:

the data preparation module splits the data randomly according to a user specification into the first set of raw data and the second set of raw data, and the first set of raw data is submitted to the feature extraction module and the second set of data is submitted to the testing module.

4. The module information extraction system of claim 1, further comprising tool means for assisting with the preparation of the raw data for training, wherein the tool means is selected from a fifth type of the interchangeable modules and includes at least (i) filtering means for filtering out documents from the raw data before training and (ii) random splitting means for randomly splitting the raw data into a training set and a testing set of raw data.

5. The module information extraction system of claim 1, wherein the feature extraction module includes:

a feature definition module for extracting the first set of raw data received from the data preparation module and preparing a feature count table in vector format; and a feature selection module for reducing or altering the feature count table in vector format based on user specified selection criteria, wherein the feature definition module and the feature selection module are individually driven.

6. The module information extraction system of claim 5, wherein:

the feature selection module consults the feature count table in vector format when features of the first set of raw data are selected by the user and prepares the reduced feature count table in vector format based on the user specified selection criteria, and the core classification module consults the reduced feature count table in vector format when applying the learning algorithm.

7. The module information extraction system of claim 5, wherein:

the testing module tests the second set of raw data having class labels received by the data preparation module to determine whether the class labels of the second set of raw data corresponds to the resulting classifier, and when the resulting classifier does not approximately coincide with the set of preassigned classes in the second set of raw data, the reduced feature count table is update by user specified selection criteria and the core classification module reapplies the learning algorithm to the updated reduced feature count table in vector format in order for the resulting classifier to approximately coincide with the set of preassigned classes in the second set of data.

8. The module information extraction system of claim 5, wherein the feature definition module further performs stemming, abbreviation expansion, names or term extraction, thereby defining the features to be used.

9. The module information extraction system of claim 1, wherein the feature extraction module further counts the frequencies of features in the raw data and provides the frequencies of the features in a feature count table.

10. The module information extraction system of claim 9, wherein the feature count table provides information so that successive training does not have to revisit the raw data.

11. The module information extraction system of claim 1, further comprising configuration means for storing documentation on how the classifiers are created by the core classification module in order to generate and retrieve a feature count table file.

12. A method for extracting information from natural language documents, comprising:

preparing a first set of raw data having class labels to be tested;

extracting features from the raw data and storing the features in a vector format;

applying a learning algorithm to the stored vector format and producing therefrom a resulting classifier;

comparing the resulting classifier to a set of preassigned classes;

testing a second set of raw data having class labels to determine whether the class labels of the second set of raw data corresponds to the resulting classifier in the second set of raw data; and when the resulting classifier does not coincide with the set of preassigned classes in the second set of raw data, updating the reduced feature count table by user specified selection criteria and reapplying the learning algorithm to the updated reduced feature count table in vector format in order for the resulting classifier to approximately coincide with the set of preassigned classes in the second set of data.

13. The method of claim 12, wherein:

splitting the data randomly according to a user specification into the first set of raw data and the second set of raw data, submitting the first set of raw data to a feature extraction module for feature extraction, and submitting the second set of data to a testing module for the testing.

14. The method of claim 12, wherein preparing the vector format includes:

extracting the first set of raw data received from the data preparation module and preparing a feature count table in vector format; and preparing a reduced feature count table in vector format based on the user specified selection criteria, wherein the extracting and preparing are individually driven.

15. The method of claim 14, further comprising consulting the reduced feature count table in vector format when applying the learning algorithm.

16. The method of claim 14, wherein the feature count table in vector format is prepared one time and separate reduced feature count tables in vector format are prepared based on the feature count table in vector format when the resulting classifier does not approximately coincide with the set of preassigned classes.

* * * * *